United States Patent [19]

Breuer et al.

[11] Patent Number: 5,758,475
[45] Date of Patent: Jun. 2, 1998

[54] METHOD OF PRODUCING A TINNED FOOD CONTAINER

[75] Inventors: Manfred Breuer, Bergheim; Klaus Hocks, Grevenbroich, both of Germany

[73] Assignee: Vaw Aluminium AG, Bonn, Germany

[21] Appl. No.: 809,615

[22] PCT Filed: Jul. 23, 1996

[86] PCT No.: PCT/EP96/03244

§ 371 Date: Apr. 18, 1997

§ 102(e) Date: Apr. 18, 1997

[87] PCT Pub. No.: WO97/04896

PCT Pub. Date: Feb. 13, 1997

[30] Foreign Application Priority Data

Jul. 26, 1995 [DE] Germany ............ 195 27 291.9

[51] Int. Cl.$^6$ ........................................ B65B 47/00
[52] U.S. Cl. ........................ 53/453; 53/559; 53/578; 493/85; 493/109
[58] Field of Search ............. 413/8, 9, 23; 72/379.2, 72/379.4; 53/453, 559, 578; 493/85, 109

[56] References Cited

U.S. PATENT DOCUMENTS

| | | | |
|---|---|---|---|
| 1,884,699 | 10/1932 | Hothersall | 413/8 |
| 2,016,225 | 10/1935 | Bukolt | 413/23 |
| 2,157,978 | 5/1939 | Bullock. | |
| 3,577,700 | 5/1971 | Bippus et al. | 53/453 |
| 5,105,645 | 4/1992 | Kobayashi et al. | 72/379.4 |
| 5,249,447 | 10/1993 | Aizawa et al. | 72/379.4 |
| 5,487,295 | 1/1996 | Diekhoff et al. | 72/379.4 |

FOREIGN PATENT DOCUMENTS

| | | |
|---|---|---|
| 0 048 268 | 1/1991 | European Pat. Off. . |
| 15 86 288 | 8/1970 | Germany . |
| 33 44 441 | 6/1985 | Germany . |
| 43 32 306 | 3/1995 | Germany . |
| 180197 | 11/1993 | Taiwan . |
| 1 053 677 | 1/1967 | United Kingdom . |
| 2 022 474 | 12/1979 | United Kingdom . |

Primary Examiner—James F. Coan
Assistant Examiner—Gene L. Kim
Attorney, Agent, or Firm—Collard & Roe, P.C

[57] ABSTRACT

A method of producing a tinned food container has a container body 1 of a flat material, especially aluminum strip or tinplate strip which is deep-drawn and which, at least in the region of its planar end flange, is provided with a coating 2, especially a sealing coating, and has a cover 4 provided with a further coating, especially a further sealing coating, and is made of a foil material, especially aluminum foil, is sealed on to the edge flange under the influence of pressure and/or heat. To make the production method more economical, and for producing a container body with an intermediate sealing layer 3 additionally inserted during the sealing-on operation, first the blank for the container body 1 and intermediate sealing layer 3 is punched in one piece out of the flat material. Then the intermediate sealing layer 3 subsequently is separated from the container body 1 in the region of the edge flange. Then after the deep-drawn container body has been expanded towards its edge flange and/or after the dimensions of the intermediate layer have been reduced, the intermediate sealing layer 3 is placed on to the edge flange.

12 Claims, 2 Drawing Sheets

METHOD OF PRODUCING A TINNED FOOD CONTAINER

The invention relates to a method of producing a tinned food container wherein the container body consists of a flat material, especially aluminium strip or tinplate strip which is deep-drawn and which, at least in the region of its planar edge flange, is provided with a coating, especially a sealing coating and wherein a cover provided with a further coating, especially a further sealing coating, and consisting of a foil material, especially aluminium foil, is sealed on to the edge flange under the influence of pressure and/or heat.

Such a method is known from DE 33 44 441 wherein the container body and cover are sealingly connected to one another by the sealing-on operation in that the sealing coating is sealed on by means of a sealing tool under the influence of pressure and/or heat. The sealing-on operation takes place after the container body has been filled with the material to be preserved. However, during the filling operation it cannot be guaranteed that parts of the material to be preserved do not reach the planar edge flange of the container body. This means that the sealing layer is interrupted and that leakage problems may occur during the subsequent sealing operation.

This is the reason why there exist methods of producing a tinned food container wherein, in addition to the container body, there is produced an intermediate sealing layer (a so-called "sealing ring") which, in turn, is connected to the cover or cover foil in a material-locking way and which is placed on to the edge flange of the container body after the container has been filled. However, the disadvantage of such a method is that the container body and the intermediate sealing layer usually provided in the form of a sealing ring have to be produced separately from one another. The production of the sealing ring results in a high percentage of production-related waste because the only part used is the surface which is subsequently placed on to the edge flange, whereas inside the annular region and towards the adjoining ring there remain unused surface parts of the flat material.

A further method of the initially mentioned type is known from DE-OS 15 86 288 wherein use is made of an additionally inserted intermediate sealing layer which consists of a thermoplastic material.

It is therefore the object of the invention to improve the economic aspects of a method of the initially mentioned type.

The objective is achieved in that for producing a container body with an intermediate sealing layer additionally inserted during the sealing-on operation, first the blank for the container body and intermediate sealing layer is punched in one piece out of the flat material, with the intermediate sealing layer subsequently being separated from the container body in the region of the edge flange, and that, then, after the deep-drawn container body has been expanded towards its edge flange and/or after the dimensions of the intermediate sealing layer have been reduced, the intermediate sealing layer is placed on to the edge flange.

The invention is characterised by the fact that the production method is rendered more economical in that by producing the intermediate sealing layer and the container jointly, the amount of waste material (percentage of scrap) is reduced considerably because the entire material of the blank of the container body and intermediate sealing layer can be used. By increasing the size of the edge region, the edge flange and sealing ring can be formed jointly. By subsequently separating the sealing ring from the edge flange region, the blank does not contain a percentage of scrap. Reconnection of the container body with the intermediate sealing layer provided with the cover can be effected easily in that either the container body is expanded towards the edge flange or the intermediate sealing layer is reduced in respect of its dimensions. Said two adaptation processes can also be combined.

In a preferred embodiment, the intermediate sealing layer is provided in the form of a sealing ring whose contour corresponds to that of the edge flange.

The deep-drawn container body may be expanded conically, for example by 3 to 10%, or in steps, with the cross-section of the container body expanding towards the edge flange.

The intermediate sealing layer can be separated from the container body either before or, preferably, after the deep-drawing operation.

If the container body is adapted to the intermediate sealing layer by reducing the dimensions of the intermediate sealing layer for example by reducing the diameter of an intermediate sealing layer provided in the form of a sealing ring, this can be effected in an easy way by drawing in the outer edge towards the inner edge until the diameter of the container body has been reached. In a preferred embodiment, this is achieved by applying a suitable pressure so that the formation of folds is avoided.

Below, the invention will be explained in greater detail with reference to a drawing therein FIG. 1 is a sketch for explaining the production method for a tinned food container provided with an intermediate sealing layer additionally inserted during the sealing- on operation, such as it is used in practice.

Figure 1:
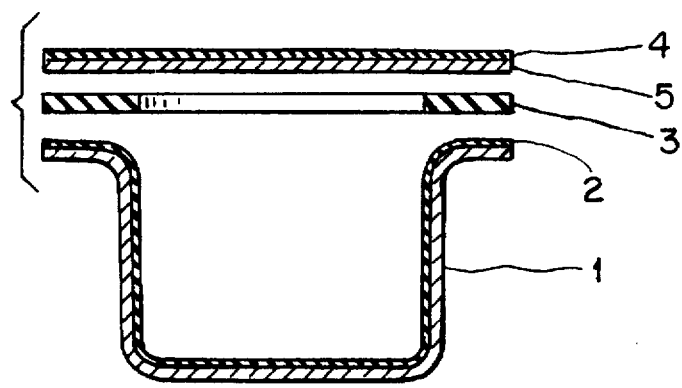

In the case of the method of producing a tinned food containing body with an intermediate sealing layer additionally inserted during the sealing-on operation, as illustrated in FIG. 1, the first stage consists in deep-drawing the container body 1 consisting of a flat material, especially aluminium strip, to provide same with the profile as illustrated. The container body 1 is provided with a sealing coating 2.

A sealing ring 3 serving as an intermediate sealing layer is punched out of the flat material separately from the container body 1. The upper part of the tinned food containing body is formed by a cover foil 4 whose underside is provided with a further sealing coating 5. The sealing ring 3 and cover foil 4 are connected to one another in a material-locking way, i.e. by hot sealing or glueing. After the filling operation, the connection between the container body 1 on the one hand and the sealing ring 3 and cover 4 on the other hand takes place by a conventional sealing-on operation under the influence of pressure and/or heat or alternatively or additionally, by beading the sealing ring 3 and container body 1 in the edge flange region of same.

In accordance with the inventive method according to FIG. 2, first, during a production stage not illustrated, a blank is punched out of a flat material, especially aluminium strip, with said blank being shaped in such a way that it comprises the container body on the one hand and the surface required for the sealing ring on the other hand. Subsequently, as shown in FIG. 2A, the container body 1 is deep-drawn and the remaining part of the material is angled to form a planar region.

Figure 2A:
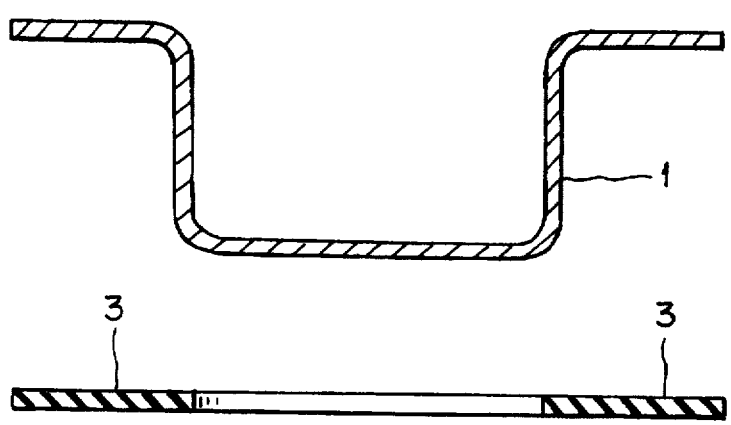
FIGS. 2A to 2D show the production stages in accordance with an embodiment of the invention.
Figure 2B:

Subsequently, a cutting operation takes place along the dash-dotted lines as shown in FIG. 2B, in the edge region between the planar and the deep-drawn part. In this way, the later sealing ring is separated from the remaining container body.

Figure 2C:
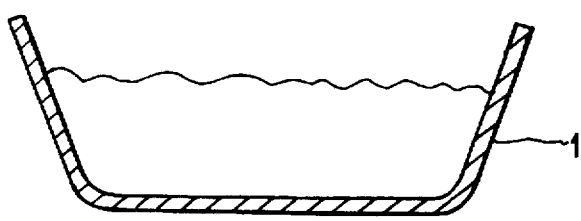

Subsequently, the container body 1, as shown in FIG. 2C, is expanded to such an extent that there is obtained a cross-section which expands conically upwardly. Thereafter, the material to be preserved is filled into the container body 1.

In the course of the next production stage (FIG. 2D), the sealing ring 3 provided with the cover foil 4 is again placed on to the flattened edge flange region of the container body 1. Subsequently, the sealing ring and cover foil 4 are firmly connected to the container body by beading the edge flange region of the container body 1.

As an alternative or in addition to the conical expansion of the container body 1 as illustrated in FIG. 2C, it is also possible for the container body 1 to be increased in steps towards the edge flange region.

Figure 2D:
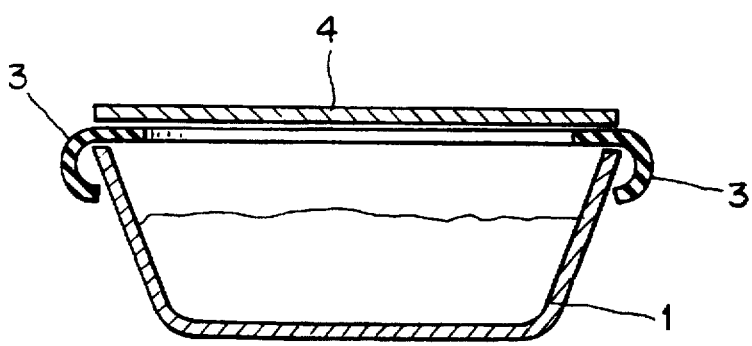
Figure 3A:
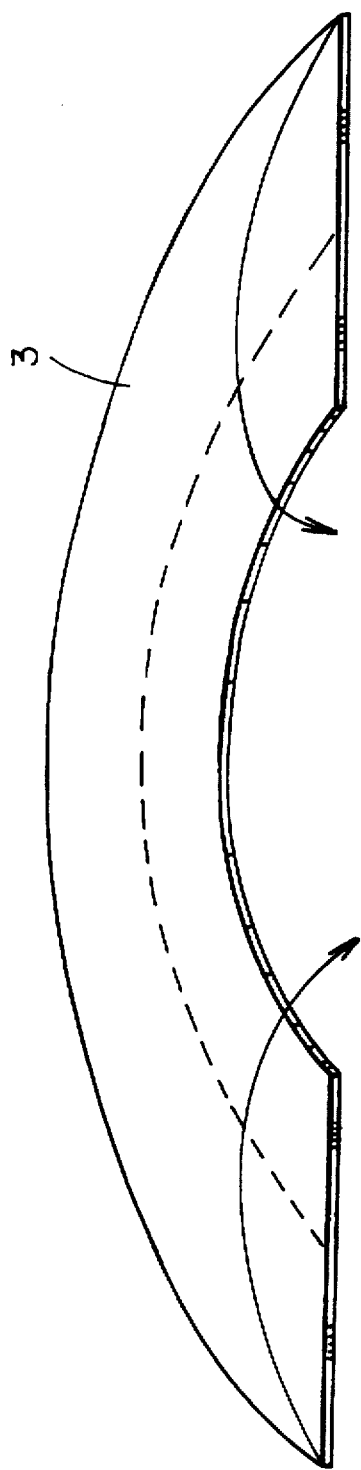
FIGS. 3A and 3B are sketches for explaining the operation of reducing the diameter of an intermediate sealing layer provided in the form of a sealing ring.
Figure 3B:
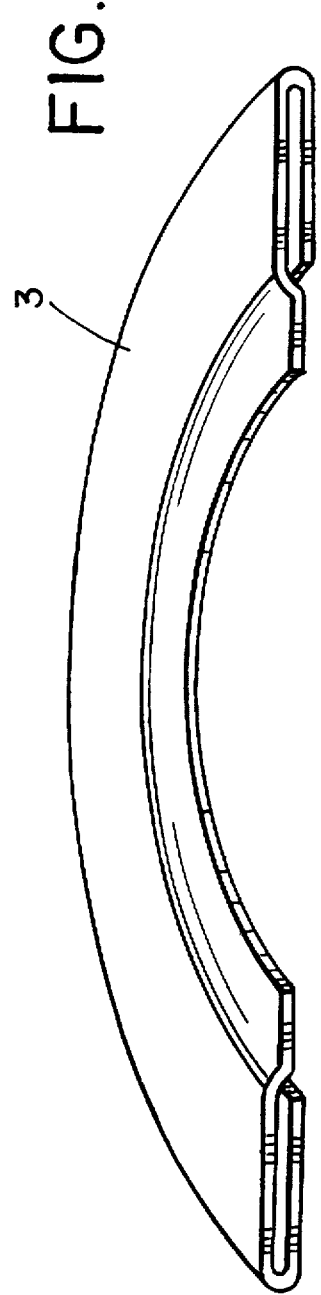

Instead of applying the above-mentioned production method explained with reference to the production stages according to FIGS. 2C and 2D, the sealing ring 3 and container body 1 can also be connected in that the diameter of the sealing ring 3 is reduced in such a way that the sealing ring 3 is adapted to the edge flange region of the container body 1. This is achieved —as illustrated in FIGS. 3A and 3B—in that the sealing ring 3 only part of which is shown is positioned along the dashed line so as to partially overlap in that the outer edge of the sealing ring 3 is drawn in towards the inner edge in the direction of the arrow. This results in the embodiment shown in FIG. 3B wherein the inner ring comprises an inner diameter which is reduced as compared to the illustration according to FIG. 3A. To avoid the formation of folds, pressure is applied after the outer edge has been drawn in towards the inner edge.

We claim:

1. A method of producing a tinned food container comprising providing a container body made of a flat material, which is deep-drawn and which, at least in a region of a planar edge flange, has a sealing coating;

providing an intermediate sealing layer for the container body additionally inserted during a sealing-on operation, by first punching the blank for the container body and intermediate sealing layer in one piece out of the flat material;

separating the intermediate sealing layer subsequently from the container body in the region of the planar edge flange, and that then, after expanding the deep-drawn container body towards said edge flange, placing the intermediate sealing layer on to the edge flange, and placing the intermediate sealing layer on to the edge flange; and providing a cover with a further sealing coating and comprising a foil material, said cover being sealed on to the planar edge flange under the influence of pressure or heat.

2. A method according to claim 1,
wherein the intermediate sealing layer is a sealing ring.

3. A method according to claim 1, comprising
expanding conically the deep-drawn container body.

4. A method according to claim 1, comprising
expanding the deep-drawn container body in steps in a direction of an edge flange.

5. A method according to claim 1, comprising
separating the intermediate sealing layer after the container body has been deep-drawn.

6. A method according to claim 1, comprising
connecting the intermediate sealing layer to the cover, in a material-locking way and subsequently placing the layer on to the edge flange.

7. A method according to claim 1,
wherein the flat material is selected from the group consisting of an aluminum strip and a tinplate strip.

8. A method according to claim 1,
wherein the foil material is aluminum foil.

9. A tinned food container with an intermediate sealing layer, produced by a method as claimed in claim 1.

10. A method according to claim 1, comprising
reducing the diameter dimensions of the intermediate sealing layer.

11. A method of producing a tinned food container comprising providing a container body made of a flat material, which is deep-drawn and which, at least in a region of a planar edge flange, has a sealing coating;

providing an intermediate sealing layer for the container body additionally inserted during a sealing-on operation, by first punching the blank for the container body and intermediate sealing layer in one piece out of the flat material;

separating the intermediate sealing layer subsequently from the container body in the region of the planar edge flange, and that then, after expanding the deep-drawn container body towards said edge flange, reducing the diameter dimensions of the intermediate sealing layer by drawing in an outer edge towards an inner edge of the sealing layer;

placing the intermediate sealing layer on to the edge flange; and providing a cover with a further sealing coating and comprising a foil material, said cover being sealed on to the planar edge flange under the influence of pressure or heat.

12. A method according to claim 1, comprising
drawing the outer edge in towards the inner edge under the influence of pressure.

* * * * *

UNITED STATES PATENT AND TRADEMARK OFFICE
CERTIFICATE OF CORRECTION

PATENT NO. : 5,758,475
DATED : June 2, 1998
INVENTOR(S) : BREUER ET AL

It is certified that error appears in the above-indentified patent and that said Letters Patent is hereby corrected as shown below:

In the Title page, item [73] column 1, line 1 change "Vaw Aluminium AG" to -- VAW aluminium AG --

Signed and Sealed this

Eighth Day of September, 1998

Attest:

BRUCE LEHMAN

*Attesting Officer*     *Commissioner of Patents and Trademarks*